(12) United States Patent
Okada et al.

(10) Patent No.: US 7,000,633 B2
(45) Date of Patent: Feb. 21, 2006

(54) FLOW AMOUNT CONTROL DEVICE

(75) Inventors: Motohiro Okada, Obu (JP); Mitomu Mohri, Kariya (JP)

(73) Assignee: Denso Corporation, Kariya (JP)

( * ) Notice: Subject to any disclaimer, the term of this patent is extended or adjusted under 35 U.S.C. 154(b) by 418 days.

(21) Appl. No.: 10/455,349

(22) Filed: Jun. 6, 2003

(65) Prior Publication Data

US 2003/0226593 A1 Dec. 11, 2003

(30) Foreign Application Priority Data

Jun. 6, 2002 (JP) .............................. 2002-165494

(51) Int. Cl.
  *E03B 3/18* (2006.01)
(52) U.S. Cl. ..................... 137/550; 137/549; 210/405
(58) Field of Classification Search ................ 137/544, 137/549, 550; 210/438, 432, 429, 390, 399, 210/405
  See application file for complete search history.

(56) References Cited

U.S. PATENT DOCUMENTS 2,087,356 A * 7/1937 Parker ......................... 303/54
3,097,660 A * 7/1963 Priesmeyer .................. 137/316
3,906,981 A * 9/1975 Jensen et al. ........... 137/115.26
4,175,584 A * 11/1979 Rikuta ......................... 137/504
5,492,143 A * 2/1996 Cooper et al. ............ 137/15.01

FOREIGN PATENT DOCUMENTS

| JP | 6-52908 | 7/1994 |
|----|---------|--------|
| JP | 2001-41349 | 2/2001 |
| JP | 2001-173806 | 6/2001 |

* cited by examiner

*Primary Examiner*—A. Michael Chambers
(74) *Attorney, Agent, or Firm*—Nixon & Vanderhye P.C.

(57) ABSTRACT

A filter is annularly attached around a peripheral wall of a housing. The filter is composed of a filtering element that covers a fluid passage for inhibiting foreign objects from entering, a supporting portion for supporting the filtering element, and a connecting portion for connecting between both ends of the supporting portion. The connecting portion is narrower than the supporting portion. The filter is movable radially in two directions according to a clearance between the filter and the housing. A contact portion is formed, with being able to be slid within a movable range of the filter, between an outer surface portion of the peripheral wall that surrounds an opening of the fluid passage and an inner surface portion of the filter that surrounds the filtering element.

10 Claims, 5 Drawing Sheets

FLOW AMOUNT CONTROL DEVICE

CROSS REFERENCE TO RELATED APPLICATIONS

This application is based on and incorporates herein by reference Japanese Patent Application No. 2002-165494 filed on Jun. 6, 2002.

FIELD OF THE INVENTION

The present invention relates to a flow amount control device that restricts entering of foreign objects through fluid passages.

BACKGROUND OF THE INVENTION

A known flow amount control device has a housing whose peripheral wall is penetrated by fluid passages, and a valve member contained within the housing, and controls an amount of fluid flowing among the fluid passages by reciprocating the valve member. The flow amount control device includes a filter for inhibiting foreign objects from entering an inside of the housing through the fluid passages.

In JP-2001-173806A, a flow amount control device (fluid control valve) includes a filter that is fitly attached annularly around a peripheral wall of a housing. The filter includes: a filtering element that covers a fluid passage for inhibiting foreign objects from entering the fluid passage; a supporting portion (annular portion) that circumferentially extends and supports a peripheral edge of the filtering element; and a connecting portion (attaching portion) that circumferentially extends and connects between both circumferential ends of the supporting portion. Here, breadth of the connecting portion is narrower than that of the supporting portion, so that a groove (concave portion) where the connecting potion is embedded can be narrower than a groove where the supporting portion is embedded. The narrow groove for the connecting portion of a filer and the wide groove for the supporting portion of another filter are disposed, on the peripheral wall, alternately in an axial direction of the housing, so that length in the axial direction of the housing can be shortened.

In above JP-2002-173806A, a clearance is generated between the filter and the peripheral wall of the housing due to tolerance in manufacturing. When fluid pressure is applied to the filtering element, the filter moves radially. A clearance that is larger than the foreign objects to be filtered may be thereby generated between the groove of the peripheral wall and a peripheral portion of the supporting portion, so that an effect of inhibiting ingress of the foreign objects is lessened. Furthermore, when the connecting portion of the filter is pushed upon the peripheral wall due to the move of the filter, the connecting portion may be broken with tension.

SUMMARY OF THE INVENTION

It is an object of the present invention to provide a flow amount control device that restricts entering of foreign objects through fluid passages.

To achieve the above object, a flow amount control device is provided with the following. A housing whose peripheral wall is cylindrical is provided and it is penetrated by fluid passages. A valve member is provided as being contained in the housing and controlling a flow amount of fluid that passes through the fluid passages. A filter is provided as being circumferentially attached around the peripheral wall. The filter includes: a filtering element that covers the fluid passage for inhibiting foreign objects from entering the fluid passage; a supporting portion that extends circumferentially for supporting a peripheral edge of the filtering element; and a connecting portion that extends circumferentially for connecting between circumferential both ends of the supporting portion. The breadth of the connecting portion is narrower than that of the supporting portion. The filter is movable within a movable range according to a clearance between the filter and the peripheral wall. A first sealing portion is formed as surrounding an opening of the fluid passage in the peripheral wall, and a second sealing portion is formed as surrounding the filtering element in an inner surface of the supporting portion. The first sealing portion and the second sealing portion seal a gap between them by contacting with each other with being able to be slid within the movable range of the filter. This structure restricts entering of the foreign objects through the fluid passage by combining filtering function of the filtering element, with sealing function of the contact between the above first and second sealing portions, even when the filter moves according to the clearance with the peripheral wall.

It is preferable that the flow amount control device is further provided with the following. The connecting portion of the filter can be divided into a first and a second division portions at a circumferentially intermediate point. The first division portion has a first convex portion and the second division portion has a first concave portion, and one of the division portions has a second convex portion and the other has a second concave portion. The first convex portion and the first concave portion are hooked with each other, with being unable to be circumferentially detached, and the second convex portion and the second concave portion are hooked with each other, with being unable to be radially detachable. This structure enables the filter to be easily attached around the peripheral wall of the housing and to be hardly detached from the peripheral wall. This results in securely obtaining an effect of restricting entering of the foreign objects through the fluid passage.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

Figure 1A:
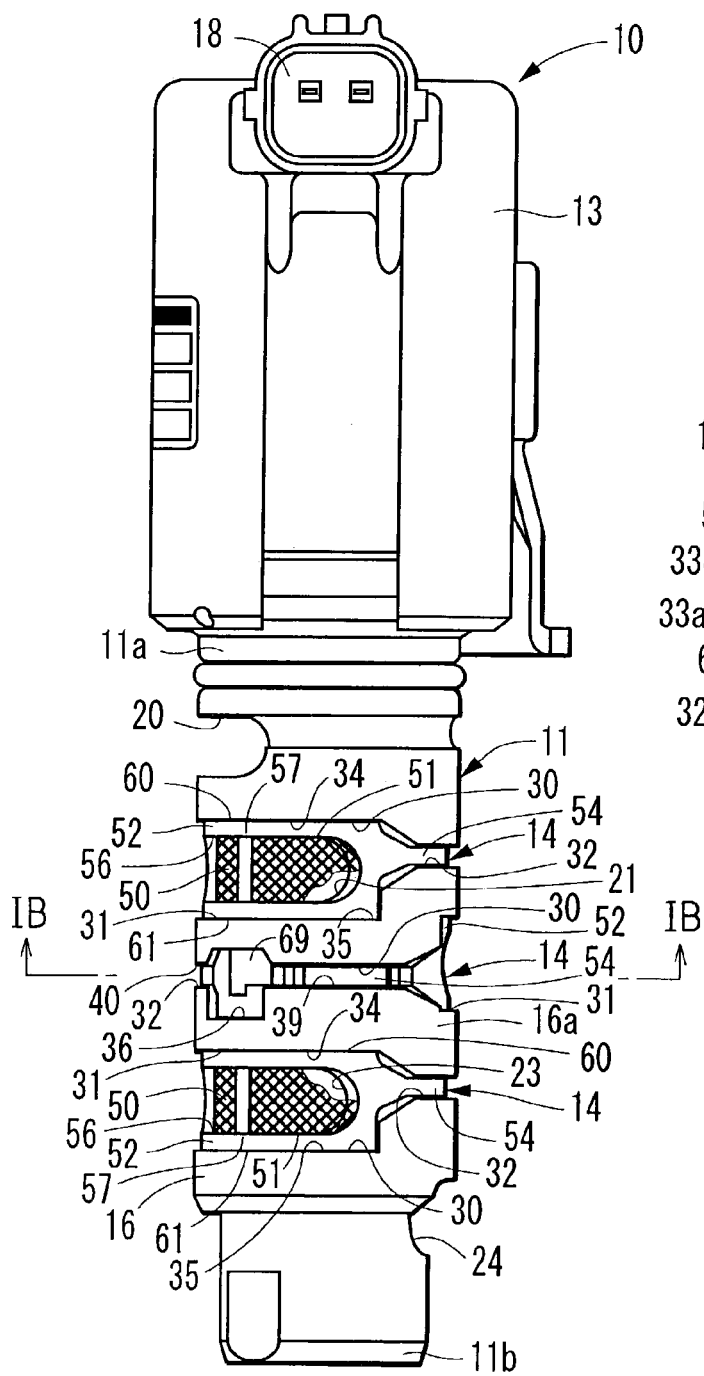
FIG. 1A is a elevational view a flow amount device according to an embodiment of the present invention.
Figure 1B:
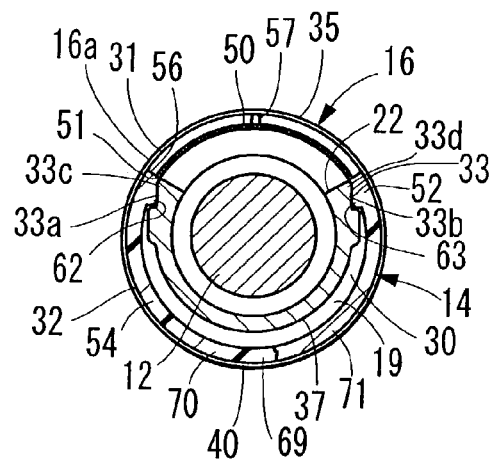
FIG. 1B is a cross-sectional view taken along 1B—1B of FIG. 1A.
Figure 2:
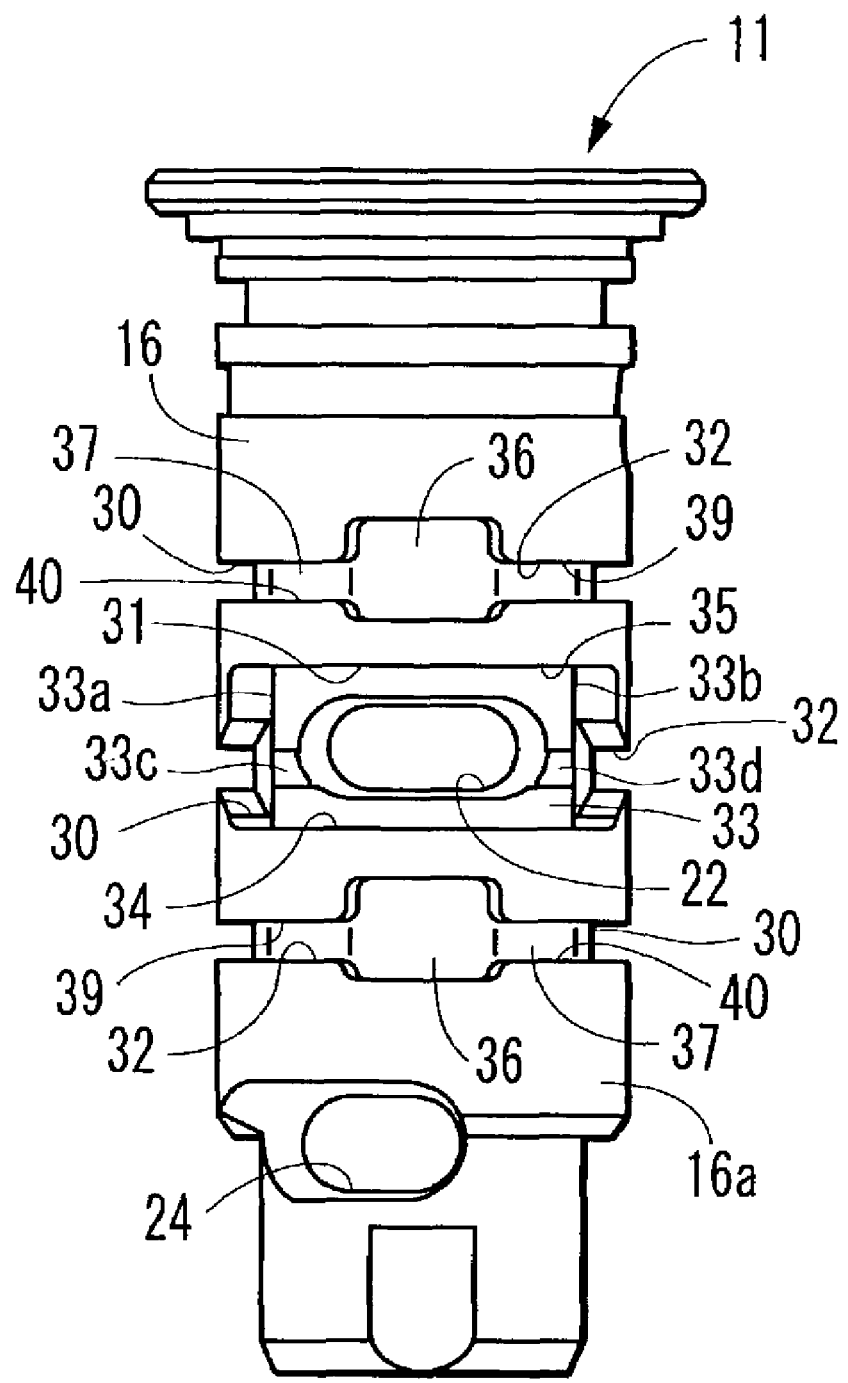
FIG. 2 is a view of a sleeve shown in FIG. 1A.

A flow amount control device 10 according to an embodiment of the present invention is shown in FIG. 1A. The flow amount control device 10 is assembled in an engine. A valve timing adjusting device is assembled in the engine for adjusting valve timing of a suction or exhaust valve by oil pressure control. The flow amount control device 10 controls an amount of operating oil with which the valve timing adjusting device is provided.

Figure 3A:
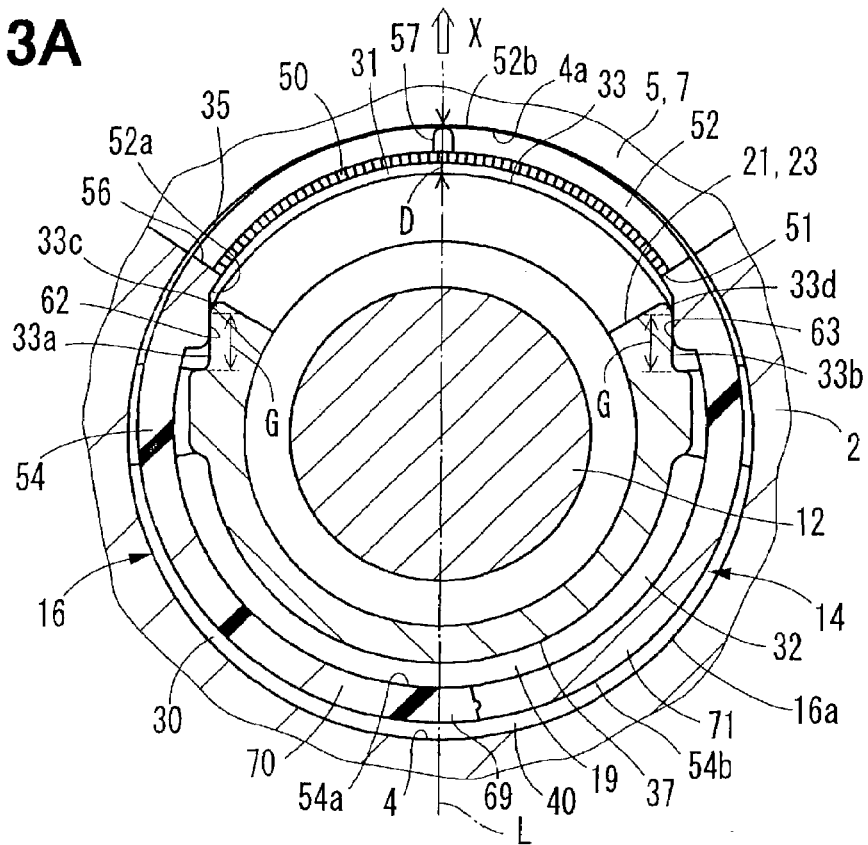
FIGS. 3A and 3B are cross-sectional views showing a state where the flow amount control device is assembled in an assembling member of an engine.
Figure 3B:
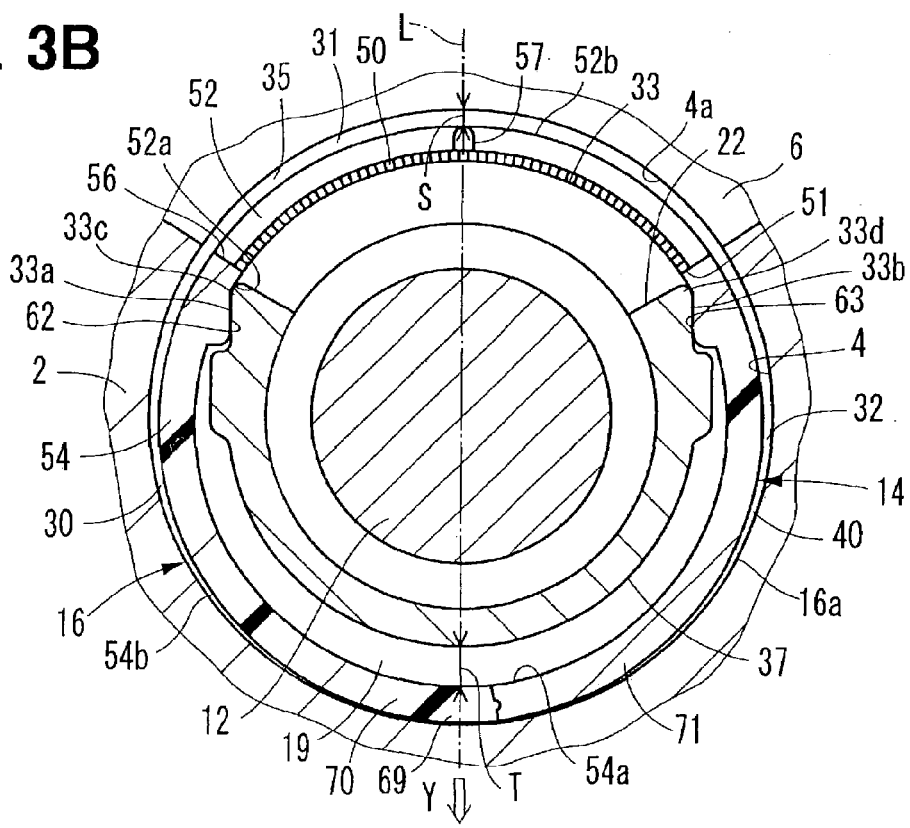

The flow amount control device 10 includes a sleeve 11 as a housing, a spool 12 as a valve member, an electromagnetic drive device 13, a filter 14, and the like. The sleeve 11 shown in FIGS. 1A, 1B, 2, 3A, 3B, 5A is formed in a generally cylindrical shape by die-casting of aluminum. As shown in FIGS. 3A, 3B, the sleeve 11 is inserted within an insertion bore 4 provided in an assembling member 2 of the engine along with the filter 14. The sleeve 11 includes fluid passages 20 to 24 that penetrate a peripheral wall 16 of the sleeve 11. The fluid passages 20 to 24 are disposed in a row on the peripheral wall from one end 11a of the sleeve 11 to the other end 11b. In detail, the fluid passages 21, 23 are disposed along a same line parallel with an axis of the sleeve 11 while the fluid passage 22 is disposed along a different line with the axis of the sleeve 11. The fluid passages 21, 23 are fluidly connected with an advancing oil pressure chamber or a delaying oil pressure chamber of the valve timing adjusting device through flow paths 5, 7 provided in the assembling member 2. The fluid passage 22 is fluidly connected with an oil pump through a flow path 6 provided in the assembling member 2. The fluid passages 20, 24 are fluidly connected with an tank located in an inlet of the oil pump through a flow path (not shown) provided in the assembling member 2.

The sleeve 11 contains, within the peripheral wall 16, the spool 12 that is able to be reciprocated in an axial direction of the sleeve 11. The electromagnetic drive device 13 is fixed on the one end 11a of the sleeve 11, for driving to reciprocate the spool 12 with power supply from a connector 18. The spool 12 controls, by changing a drive position, a flow amount of the operating oil that flows among the fluid passages. For instance, a flow amount of an operating oil with which the valve timing adjusting device is provided from the fluid passages 21, 23.

On an outer surface 16a of the peripheral wall 16 of the sleeve 11, annular grooves 30 are formed correspondingly to the fluid passages 21, 22, 23. Each of the annular grooves 30 is composed of a wide groove 31 and a narrow groove 32, both of which are linked circumferentially (with respect to the axis of the sleeve 11). The wide grooves 31 corresponding to the fluid passages 21, 23 and the narrow groove 32 corresponding to the passage 22 are disposed axially (in the axial direction of the sleeve 11) in a row, as shown in FIG. 1A. By contrast, the narrow grooves 32 corresponding to the fluid passages 21, 23 and the wide groove 31 corresponding to the passage 22 are disposed axially in a row.

The wide groove 31 is formed of a bottom wall portion 33 to which the fluid passage 21, 22, or 23 opens, and two side wall portions 34, 35 that are generally perpendicular to the bottom wall portion 33 and parallel with each other. The wide groove 31 circumferentially extends to form a circular ark with having a certain breadth. In the bottom wall portion 33, both circumferential end portions 33a, 33b are formed in planes parallel with each other and constitute two-surface-breadth fitting structure that has two surfaces between which a breadth used for fitting is provided. The corresponding fluid passage 21, 22, or 23 is sandwiched between both circumferential end portions 33a, 33b.

The circumferential end portions 33a, 33b function as guiding the filter 14, so that they are called as guiding portions 33a, 33b. The guiding portions 33a, 33b extend axially (in the axial direction of the sleeve 11 or in a breath direction of the wide groove 31) between the side wall portions 34, 35 with contacting the side wall portions 34, 35. A closed loop composed of the side wall portions 33, 35 and guiding portions 33a, 33b constitutes a first sealing portion with surrounding the fluid passage 21, 22, or 23. In the bottom wall portion 33, joining portions 33c, 33d are formed in areas from the guiding portions 33a, 33b to the fluid passage 21, 22, or 23, respectively, for fitly contacting with the filter 14.

The narrow groove 32 is formed of a bottom wall portion 37 and two side wall portions 39, 40. The narrow groove 32 circumferentially extends to form a circular ark with a narrower breadth than that of the wide groove 31, and connects with the circumferential end portions 33a, 33b of the wide groove 31. In the narrow groove 32, an intermediate portion 36 located in a circumferentially intermediate position of the narrow groove 32 is wider than the other potion of the narrow groove 32, but narrower than that of the wide groove 31.

The filter 14 shown in FIGS, 1A, 1B, 3A, 3B, 4A, 4B, 4C, 5A, 5B is formed in a cylindrical shape and fitly attached within each annular groove 30 in the peripheral wall 16 of the sleeve 11. The filter 14 includes a filtering element 50 for inhibiting foreign objects from entering the corresponding fluid passage 21, 22, or 23, a supporting portion 52 for supporting a peripheral edge 51 of the filtering element 50, and a connecting portion 54 circumferentially connecting with the supporting portion 52.

The filtering element 50 is formed in thin mesh metal plate and in a circular ark shape around the peripheral wall 16. A size of a mesh is set, for instance at 200 μm, according to a size of a foreign object (entering-inhibited foreign object) that is inhibited from entering the fluid passages 21, 22, 23. A surface area of the filtering element 50 is set at slightly greater than an opening area of the corresponding fluid passage 21, 22, or 23.

Figure 4B:
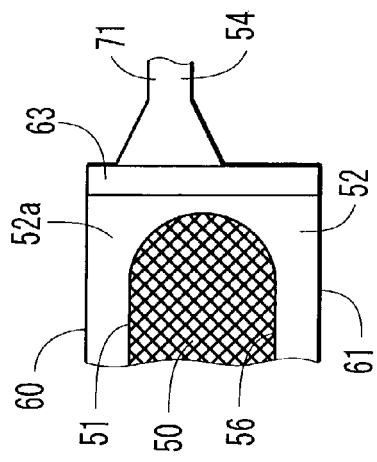
FIG. 4B is a view taken from arrows 4B of FIG. 4A.

The supporting portion 52 is formed of plastic with the filtering element 50 being inserted into it. The supporting portion 52 with which the filtering element 50 is fringed circumferentially extends to form a circular ark. The supporting portion 52 includes two outer edge portions 60, 61 that are parallel with each other and extend circumferentially (horizontally in FIGS. 4B, 4C). In this embodiment, a distance (breadth) between the two outer edge portions 60, 61 is treated as a breadth of the supporting portion 52, and very slightly narrower than that of the bottom wall portion 33 of the wide groove 31. In detail, a dimensional difference between the breadths of the supporting portion 52 and the bottom wall portion 33 is set to not exceed the size of the mesh or a minimum size of the entering-inhibited foreign object. The supporting portion 52 is fitly embedded in the wide groove 31 in the annular groove 30. When the supporting portion 52 is fitly embedded in the wide groove 31, the filtering element 50 covers the opening of the fluid passage 21, 22, or 23 with eliminating foreign objects in the operating oil before entering the fluid passage 21, 22, or 23.

The supporting portion 52 includes striated portions 62, 63 in both circumferential end portions between which the filtering element 50 is sandwiched. The striated portions 62, 63 protruding from the inner circumferential surface 52a of the supporting portion 52 are formed in planes facing parallel with each other and constitute the two-surface-breadth fitting structure. The planes of the striated portions 62, 63 are also parallel with line L (in FIGS. 3A, 3B) that extends in a radial direction of the filter 14 with passing through intermediate portions 57, 69 of the supporting portion 52 and connecting portion 54. The striated portions 62, 63 extend in an axial (breadth) direction of the filter 50 between both outer edge portions 60, 61 with connecting with both outer edge portions 60, 61. A closed loop composed of both outer edge portions 60, 61 and two striated portions 62, 63 constitutes a second sealing portion with surrounding the filtering element 50. In this embodiment, a distance between the two striated portions 62, 63 is slightly greater than that between the two guiding portions 33a, 33b of the wide groove 31. In detail, a dimensional difference is set to not exceed the size of the mesh of the filtering element 50 or the minimum size of the entering-inhibited foreign object.

When the supporting portion 52 is fitly embedded in the wide groove 31, the outer edge portions 60, 61 of the second sealing portion fitly contact with the side wall portions 34, 35 of the first sealing portion, respectively, through a clearance based on a dimensional difference of breadth between the supporting portion 52 and the wide groove 31. By contrast, when the supporting portion 52 is fitly embedded in the wide groove 31, the striated portions 62, 63 of the second sealing portion fitly contact with the guiding portions 33a, 33b of the first sealing portion, respectively, through a clearance based on a dimensional difference of distance between the striated portions 62, 63 and the guiding portions 33a, 33b. Namely, the first sealing surrounding the fluid passage 21, 22, or 23 in the wide groove 31 of the peripheral wall 16 and the second sealing portion surrounding the filtering element 50 in the supporting portion 52 contact fitly with each other to seal for disabling entering of the entering-inhibited foreign objects.

The connecting portion 54 is formed of plastic with being integrated with the supporting portion 52. The connecting portion 54 circumferentially extend, in a circular arc with a breadth narrower than that between the two outer edge portions 60, 61, to connect with both circumferential end portions of the supporting portion 52. The connecting portion 54 is fitly embedded in the narrow groove 32 of the annular groove 30. The intermediate portion 69 located in a circumferentially intermediate position of the connecting portion 54 is wider than that of the other portion of the connecting portion 54, within a range that does not exceed the breadth of the supporting portion 52. The connecting portion 54 is formed as being divided into two division portions 70, 71 in the intermediate portion 69.

Figure 4C:
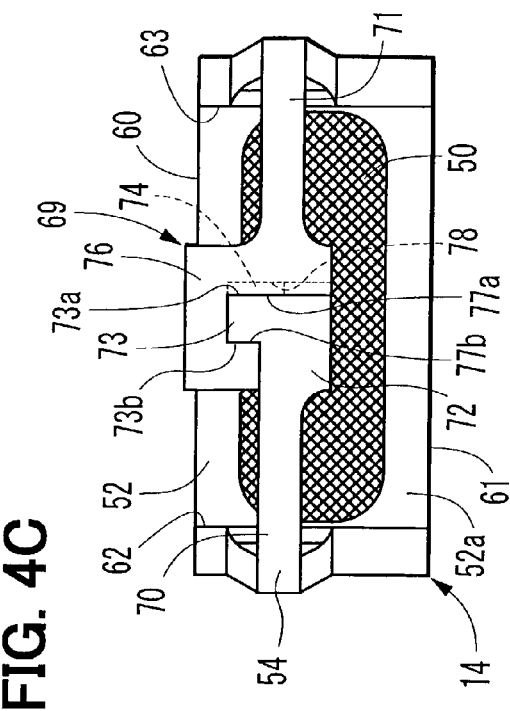
FIG. 4C is a side view of the filter shown in FIG. 1A.

In detail, an end portion 72 of a first division portion 70 that partially constitutes the intermediate portion 69 has a first convex portion 73 and a second convex portion 74, as shown in FIG. 4C. The first convex portion 73 protrudes from the end portion 72 in one direction (upper direction in FIG. 4C and FIG. 5A) of breadth of the connecting portion 54. The second convex portion 74 protrudes from a side edge portion 73a of the first convex portion 73 to face the second division portion 71 in a circumferential direction of the connecting portion 54. An end portion 76 of the second division portion 71 that constitutes a residual portion of the intermediate portion 69 has a first concave portion 77 and a second concave portion 78 as shown in FIG. 4C. The first concave portion 77 is formed, in the end portion 76, in a shape that complements the first convex portion 73 and is depressed in a protruding direction of the first convex portion 73. The second concave portion 78 is formed, in a side edge portion 77a of the first concave portion 77, in a shape that complements the second convex portion 74, and is depressed in a protruding direction of the second convex portion 74. The second concave portion 78 opens to face the first division portion 70 in a circumferential direction of the connecting portion 54, and extends in the direction of breadth of the connecting portion 54. Namely, the second concave portion 78 does not open to an outer circumferential surface 54b of the connecting portion 54.

Figure 4A:
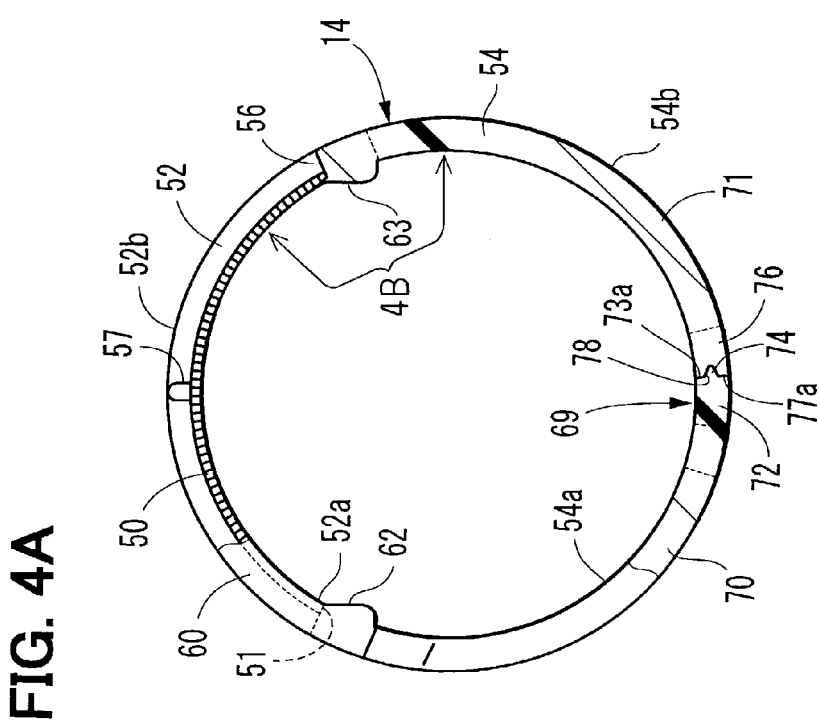
FIG. 4A is a partial sectional view of a filter shown in FIG. 1A.
Figure 5A:
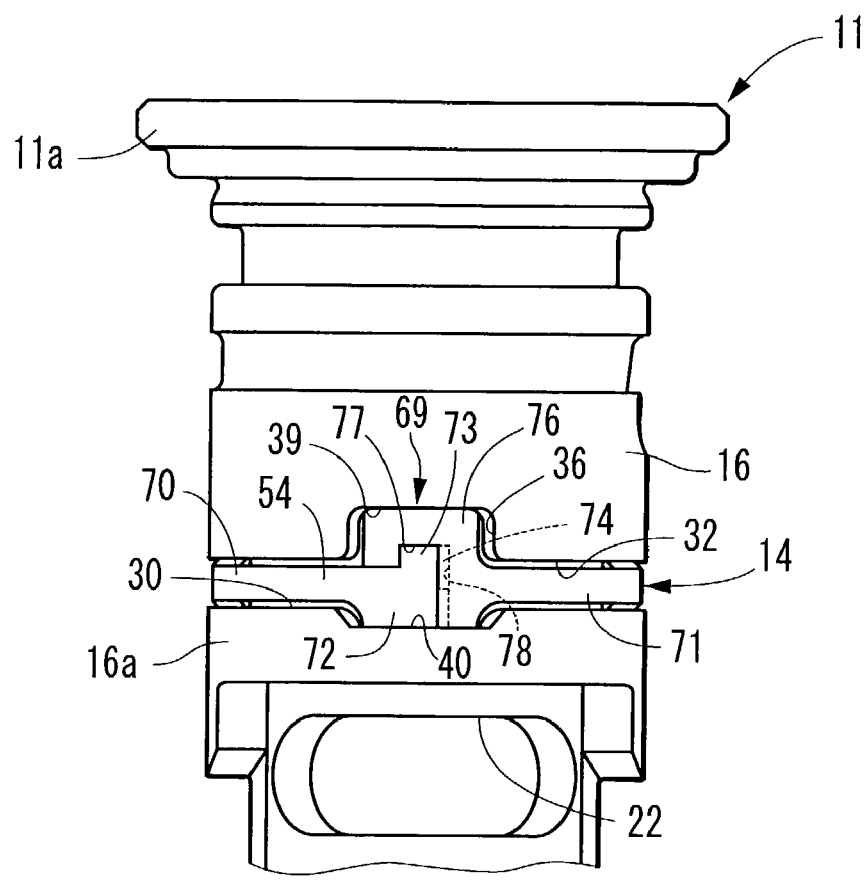
FIG. 5A is a view of a connecting portion of the filter in a state where the filter is attached around the sleeve.

As shown in FIGS. 4A, 4C, the first convex portion 73 is inserted into the first concave portion 77, and two side edge portions 73a, 73b of the first convex portion 73 fitly contact with two side edge portions 77a, 77b, respectively. The first convex portion 73 and the first concave portion 77 are thereby hooked with each other with being detachable in the breadth direction of the connecting portion 54 and not detachable in the circumferential direction. By contrast, the second convex portion 74 is inserted into the second concave portion 78, and both side edge portions of the second convex portion 74 fitly contact with both side edge portions of the second concave portion 78, respectively. The second convex portion 74 and the second concave portion 78 are thereby hooked with each other with being detachable in the breadth direction of the connecting portion 54 and not detachable in a radial direction. In this embodiment, as shown in FIG. 5A, the intermediate portion 69 of the connecting portion 54 is embedded in the intermediate portion 36 of the narrow groove 32, and the end portions 72, 76 constituting the intermediate portion 69 fitly contact side wall portions 40, 39 of the narrow groove 32, respectively. The convex portions 73, 74 are thereby undetachable, in the breadth direction of the connecting portion 54, from the concave portions 77, 78 that are hooked with the convex portions 73, 74, respectively.

In the flow amount control device 10, an inner diameter of the filter 14 is set to be greater than a diameter of the bottom wall portions 33, 37 of the annular groove 30, and a clearance 19 shown in FIGS. 3A, 3B is formed in a radial direction between the filter 14 and the peripheral wall 16. The filter 14 can be movable in the radial direction based on the clearance 19. In this embodiment, the striated portions 62, 63 of the filter 14 contact with the guiding portions 33a, 33b of the peripheral wall 16, respectively, with being able to be slid, so that the filter 14 is guided in both directions (arrow X in FIG. 3A and arrow Y in FIG. 3B) of line L. The filter 14 that is inserted into the insertion bore 4 within the assembling member 2 along with the sleeve 11. As the filter 14 moves to X direction along line L of the radial direction of the supporting portion 52, an outer surface 52b of the supporting portion 52 contacts with an inner surface 4a of the insertion bore 4 as shown in FIG. 3A. The filter 14 is thereby limited to move further. By contrast, as the filter 14 moves to Y direction along line L, an inner surface 52a of the supporting portion 52 contacts with contacting portions 33c, 33d of the narrow groove 31 as shown in FIG. 3B. The filter 14 is thereby limited to move further. As a result, a movable region of the filter 14 is limited.

Furthermore, in the flow amount control device 10, as shown in FIG. 3B, total sum T of the clearance 19 in the radial direction is set to be greater than movable range S of the filter 14 in the radial direction. The inner surface 54a of the connecting portion 54 is thereby always departed from a bottom surface of the bottom wall portion 37 of the narrow groove 32. Furthermore, as shown in FIG. 3A, depth D of the wide groove 31 (or height of the side wall portions 34, 35) is set to be greater than movable range S of the filter 14. The outer edge portions 60, 61 of the supporting portion 52 are set to be slid with continuously contacting with the side wall portions 34, 35 within movable range S. Thereby, within movable range S of the filter 14, spacing between the outer edge portions 60, 61 and the side wall portions 34, 35 is sealed for the foreign objects to be inhibited from passing through. Furthermore, as shown in FIG. 3A, length G of the guiding portions 33a, 33b that parallel with line L is greater than movable range S of the filter 14. The striated portions 62, 63 are set to be slid with contacting with guiding portions 33a, 33b within movable range S. Thereby, within movable range S of the filter 14, spacing between the striated portions 62, 63 and the guiding portions 33a, 33b is also sealed for the foreign objects to be inhibited from passing through.

As explained, in the flow amount control device 10, as the operating oil is inputted into the fluid passage 22, the filter 14 is moved to a direction of arrow Y along line L by getting operating oil pressure at the filtering element 50 as shown in FIG. 3B. At this state, the outer edge portions 60, 61 and striated portions 62, 63 of the second sealing portion fitly contact with the side wall portions 34, 35 and guiding portions 33a, 33b, with being able to be slid. Sealing function between the first and second sealing portions is thereby securely maintained.

By contrast, as the operating oil is outputted from the fluid passages 21, 23, the filter 14 is moved to a direction of arrow X along line L by getting operating oil pressure at the filtering element 50 as shown in FIG. 3A. At this state, in similarity with the above, the outer edge portions 60, 61 and striated portions 62, 63 of the second sealing portion fitly contact with the side wall portions 34, 35 and guiding portions 33a, 33b, with being able to be slid. Sealing function between the first and second sealing portions is thereby securely maintained. Thus, according to the embodiment, the sealing function between the first and second sealing portions and filtering function of the filtering element 50 can securely restrict entering of the foreign objects into the passages 21, 22, 23.

Furthermore, as shown in FIGS. 3A, 3B, in both cases where the operating oil is inputted into the fluid passage 22 and outputted from the fluid passages 21, 23, the connecting portion 54 of the corresponding filter 14 is always departed from the bottom wall portion 37 of the narrow groove 32 without being influenced with a moved position. The connecting portion 54 is thereby not pushed upon the peripheral wall 16, so that the connecting portion 54 is hard to be broken even if it is formed as having the narrow breadth.

Furthermore, the first and second sealing portions have relatively simple structure and they are easily manufactured by die-casting and plastic forming, respectively. A clearance between the first and second sealing portions is allowed within a region that does not exceed the mesh size of the filtering element 50. Accuracy in forming can be thereby lessened. As a result, manufacturing cost can be reduced.

Figure 5B:
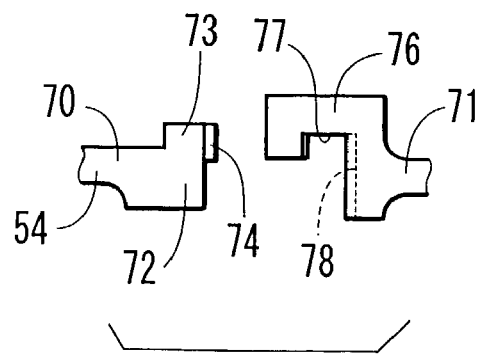
FIG. 5B is a view of the connecting portion of the filter in a state where the filter is detached from the sleeve.

Furthermore, the filter 14 can be divided at a point in a circumferential line. The filter 14 is divided into the division portions 70, 71 as shown in FIG. 5B, and the convex portions 73, 74 of the first division portion 70 are hooked with the concave portions 77, 78 of the second division portion 71 with being embedded in the annular groove 30, as shown in FIG. 5A. Therefore, the filter 14 can be easily attached around the sleeve 11. In this attached state, the first convex portion 73 is hooked with the first concave portion 77, so that the division portions 70, 71 are circumferentially not detached. The second convex portion 74 is hooked with the second concave portion 78, so that the division portions 70, 71 are radially not detached. Furthermore, the intermediate portion 69 of the connecting portion 54 is fitly embedded in the intermediate portion 36 of the narrow groove 32, so that the division portions 70, 71 are not detached in the breadth direction. As a result, even when the filter 14 gets external force, the division portions 70, 71 are hard to be detached with each other. This results in securely maintaining the filter 14 in the attached state, and in continuing an effect of inhibiting the foreign objects from entering the fluid passages 21, 22, 23.

(Modification)

The guiding portions 33a, 33b are provided in the peripheral wall 16, so that the filter 14 is limited to move within a region and the structures of the first and second sealing portions are simplified. However, the guiding portions are not always necessary.

The breadth between the outer edge portions 60, 61 of the supporting portion 52 is maintained in a same dimension in a circumferential direction. However, the breadth can be varied in the circumferential direction as long as the breadth is wider than that of the connecting portion 54.

The movable range of the filter 14 is limited by the contact of the supporting portion 52 with the insertion bore 4 and with the peripheral wall 16 of the sleeve 11. However, the movable range of the filter 14 can be limited instead by contact of the supporting portion 52 with a member provided in the flow amount control device 10.

The convex portions 73, 74 and the concave portions 77, 78 are simply constructed as being not detached in the breadth direction of the connecting portion 54, due to that the intermediated portion 69 of the connecting portion 54 is fitly embedded in the intermediate portion 36 of the narrow groove 32. However, the structure for inhibiting detachment in the breadth direction can be formed by being directly provided to the end portions 72, 76 of the division portions 70, 71.

The convex portions 73, 74 are hooked with the concave portions 77, 78, so that the division portions are linked with each other. However, as long as the division portions are linked with being not detached, a known technology can be adopted.

What is claimed is:

1. A fluid flow control device comprising:
   a housing whose peripheral wall is cylindrical and penetrated by a plurality of fluid passages;
   a valve member contained in the housing and controlling a flow amount of fluid that passes through the fluid passages; and
   a filter that is attached, circumferentially with respect to an axis of the housing, around the peripheral wall of the housing, the filter including:
      a filtering element that covers a certain fluid passage of the fluid passages for inhibiting a foreign object from entering the certain fluid passage;
      a supporting portion that extends circumferentially with respect to the axis of the housing, for supporting a peripheral edge of the filtering element, with having certain breadth that is formed in parallel with the axis of the housing; and
      a connecting portion that extends circumferentially with respect to the axis of the housing for connecting between circumferential both ends of the supporting portion, with having given breadth that is formed in parallel with the axis of the housing, wherein the given breadth of the connecting portion is narrower than the certain breadth of the supporting portion,
   wherein the filter is movable to both ends of a virtual line perpendicular to the axis of the housing within a movable range according to a clearance between the filter and the peripheral wall of the housing, wherein a first sealing portion is formed in a portion, which surrounds an opening of the certain fluid passage, of an outer surface of the peripheral wall of the housing, and a second sealing portion is formed in a portion, which surrounds the filtering element, of an inner surface of the supporting portion of the filter, and wherein the first sealing portion and the second sealing portion seal a gap between them with each other by contacting with each other, with being able to be slid within the movable range of the filter.

2. A fluid flow control device according to claim 1, wherein a size of the gap between the first and second sealing portions is only required to be smaller than a size of the foreign object that is inhibited from entering the certain fluid passage by the filtering element.

3. A fluid flow control device according to claim 1, wherein the housing includes two guiding portions in the peripheral wall, and wherein the two guiding portions guide the filter in parallel with the virtual line that passes through a circumferentially intermediate point in the supporting portion of the filter and a circumferentially intermediate point in the connecting portion of the filter.

4. A fluid flow control device according to claim 3, wherein the housing includes, around the peripheral wall, a groove in which the supporting portion of the filter is embedded, wherein the second sealing portion is formed, in the supporting portion of the filter, of two outer edge portions that extend circumferentially with respect to the axis of the housing with forming the given breadth between them and two striated portions that protrude from the inner surface of the supporting portion and extend parallel with the axis of the housing, wherein the first sealing portion is formed, in the groove of the housing, of two side wall portions of the groove and the two guiding portions that are provided in a bottom wall portion of the groove and parallel with each other, and wherein the two side wall portions of the first sealing portion contact, with being able to be slid, with the two outer edge portions of the second sealing portion, respectively, and the two guiding portions of the first sealing portion contact, with being able to be slid, with the two striated portions of the second sealing portion, respectively.

5. A fluid flow control device according to claim 3, wherein the housing and the filter are inserted in an insertion bore within a member that has a flow path fluidly connected with the fluid passages, and wherein the movable range of the filter is limited by one of contact between the filter and the peripheral wall of the housing and contact between the filter and an inner surface of the insertion bore.

6. A fluid flow control device according to claim 1, wherein the connecting portion of the filter can be divided into a first and a second division portions at a circumferentially intermediate point of the connecting portion, wherein the first division portion has a first convex portion and the second division portion has a first concave portion, and one of the first and second division portions has a second convex portion and the other of the first and second division portions has a second concave portion, and wherein the first convex portion and the first concave portion are hooked with each other, with being unable to be circumferentially detached, and the second convex portion and the second concave portion are hooked with each other, with being unable to be radially detachable.

7. A fluid flow control device according to claim 6, wherein the housing has, around the peripheral wall, another groove in which the connecting portion is embedded so that the first and second convex portions and the first and second concave portions are respectively unable to be detachable in parallel with the axis of the housing.

8. A fluid flow control device comprising:
a housing whose peripheral wall is cylindrical and penetrated by a plurality of fluid passages;
a valve member contained in the housing and controlling a flow amount of fluid that passes through the fluid passages; and
a filter that is attached, circumferentially with respect to an axis of the housing, around the peripheral wall of the housing, the filter including:
   a filtering element that covers a certain fluid passage of the fluid passages for inhibiting a foreign object from entering the certain fluid passage;
   a supporting portion that extends circumferentially with respect to the axis of the housing, for supporting a peripheral edge of the filtering element, with having certain breadth that is formed in parallel with the axis of the housing; and
   a connecting portion that extends circumferentially with respect to the axis of the housing for connecting between circumferential both ends of the supporting portion, with having given breadth that is formed in parallel with the axis of the housing, wherein the given breadth of the connecting portion is narrower than the certain breadth of the supporting portion, wherein a first sealing portion is formed in a portion, which surrounds an opening of the certain fluid passage, of an outer surface of the peripheral wall of the housing, and a second sealing portion is formed in a portion, which surrounds the filtering element, of an inner surface of the supporting portion of the filter, wherein the first sealing portion and the second sealing portion seal a gap between them with each other by contacting with each other, wherein the connecting portion of the filter can be divided into a first and a second division portions at a circumferentially intermediate point of the connecting portion, wherein the first division portion has a first convex portion and the second division portion has a first concave portion, and one of the first and second division portions has a second convex portion and the other of the first and second division portions has a second concave portion, and wherein the first convex portion and the first concave portion are hooked with each other, with being unable to be circumferentially detached, and the second convex portion and the second concave portion are hooked with each other, with being unable to be radially detachable.

9. A fluid flow control device according to claim 8, wherein a size of the gap between the first and second sealing portions is only required to be smaller than a size of the foreign object that is inhibited from entering the certain fluid passage by the filtering element.

10. A fluid flow control device according to claim 8, wherein the housing has, around the peripheral wall, a groove in which the connecting portion is embedded so that the first and second convex portions and the first and second concave portions are respectively unable to be detachable in parallel with the axis of the housing.

* * * * *